US012762067B2

(12) United States Patent
Yang et al.

(10) Patent No.: US 12,762,067 B2
(45) Date of Patent: Oct. 13, 2026

(54) METHOD AND DEVICE FOR SPLITTING OPERATORS, AND STORAGE MEDIUM

(71) Applicant: MONTAGE TECHNOLOGY CO., LTD., Shanghai (CN)

(72) Inventors: Mi Yang, Shanghai (CN); Yu Cai, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 891 days.

(21) Appl. No.: 18/117,489

(22) Filed: Mar. 6, 2023

(65) Prior Publication Data

US 2023/0289298 A1 Sep. 14, 2023

(30) Foreign Application Priority Data

Mar. 4, 2022 (CN) ......................... 202210210442.3

(51) Int. Cl.

| | |
|---|---|
| ***G06F 3/06*** | (2006.01) |
| ***G06F 9/50*** | (2006.01) |
| ***G06F 12/109*** | (2016.01) |
| ***G06N 3/08*** | (2023.01) |
| ***G06N 3/10*** | (2006.01) |

(52) U.S. Cl.

CPC .......... *G06F 12/109* (2013.01); *G06F 9/5027* (2013.01); *G06F 2212/657* (2013.01)

(58) Field of Classification Search

CPC .... G06F 12/109; G06F 9/5027; G06F 9/5016; G06F 9/5022; G06F 9/5061; G06F 2212/657; G06F 2209/5017; G06F 2209/509; G06F 3/0652; G06F 3/0656; Y02D 10/00

See application file for complete search history.

(56) References Cited

U.S. PATENT DOCUMENTS

| | | | | |
|---|---|---|---|---|
| 2020/0117999 | A1 * | 4/2020 | Yoon | G06N 3/10 |
| 2021/0011638 | A1 * | 1/2021 | Hinds | G06F 9/30036 |

FOREIGN PATENT DOCUMENTS

| | | | | |
|---|---|---|---|---|
| CN | 113672172 | A * | 11/2021 | G06F 3/0604 |
| CN | 113703775 | A * | 11/2021 | G06F 8/41 |
| CN | 113705785 | A * | 11/2021 | G06N 3/045 |

* cited by examiner

*Primary Examiner* — S. Sough
*Assistant Examiner* — Mohammad H Kabir
(74) *Attorney, Agent, or Firm* — IPRTOP LLC

(57) ABSTRACT

A method for splitting operators, a device for splitting operators and a non-transitory computer readable storage medium are provided. The method includes: S1: obtaining buffer information required by target operators; and S2: splitting the target operators to obtain a splitting result of the target operators, and obtaining a storage layout of the target operators in the first memory, based on the buffer information required by the target operators and a storage capacity of the first memory; the splitting result of the target operators and the storage layout of the target operators are used to implement a mapping of a target artificial intelligence model to an artificial intelligence hardware accelerator.

15 Claims, 3 Drawing Sheets

METHOD AND DEVICE FOR SPLITTING OPERATORS, AND STORAGE MEDIUM

CROSS REFERENCE TO RELATED APPLICATION

This application claims the benefits of priority to Chinese Patent Application No. CN 2022102104423, entitled “Method and Device for Splitting Operators, and Storage Medium”, filed with CNIPA on Mar. 4, 2022, the content of which is incorporated herein by reference in its entirety.

FIELD OF TECHNOLOGY

The present disclosure relates to data processing, in particular, to a method for splitting operators, a device for splitting operators, and a non-transitory computer readable storage medium.

BACKGROUND

In recent years, artificial intelligence (AI) technology has been developing rapidly. However, at the same time, AI models also require more computing power of hardware than ever before. In order to improve computing power of hardware, AI hardware accelerators are created.

Currently, most AI hardware accelerators adopt a tiered storage structure, which includes an external storage space with a larger capacity and a lower bandwidth, and an internal storage space with a smaller capacity and a higher bandwidth. Therefore, when such AI hardware accelerators are being used for computing, operators in the AI models need to be split to be compatible with the tiered storage structure of the AI hardware accelerators.

SUMMARY

The present disclosure provides a method for splitting operators, a device for splitting operators, and a non-transitory computer readable storage medium, which are for splitting operators of an AI model and configuring an internal storage space of an AI hardware accelerator.

A first aspect of the present disclosure provides a method for splitting operators, the method is applied to a compilation stage of an artificial intelligence hardware accelerator, the artificial intelligence hardware accelerator includes a first memory, and the method includes: S1: obtaining buffer information required by target operators; and S2: splitting the target operators to obtain a splitting result of the target operators and obtaining a storage layout of the target operators in the first memory, based on the buffer information required by the target operators and a storage capacity of the first memory, wherein the splitting result of the target operators and the storage layout of the target operators are used to implement a mapping of a target artificial intelligence model to the artificial intelligence hardware accelerator.

In an embodiment of the present disclosure, S2 further includes: S21: splitting data to be split of the target operators in one or more target dimensions so as to obtain a splitting result of the data to be split; and S22: obtaining the storage layout of the target operators in the first memory based on the splitting result of the data to be split.

In an embodiment of the present disclosure, the data to be split includes input data, weight data, and output data of the target operators, and S21 further includes: S211: configuring a first storage space in the first memory for the output data; and S212A: if the first storage space is not successfully configured, splitting the weight data in a first target dimension to obtain a splitting result of the weight data, and configuring a second storage space in the first memory for the weight data after splitting, based on the splitting result of the weight data; then, if the second storage space is successfully configured, splitting the input data in a second target dimension to obtain a splitting result of the input data, and configuring a third storage space in the first memory for the input data after splitting, based on the splitting result of the input data; or S212B: if the first storage space is successfully configured, splitting the input data in the second target dimension to obtain the splitting result of the input data, and configuring the third storage space in the first memory for the input data after splitting, based on the splitting result of the input data.

In an embodiment of the present disclosure, S212B further includes: if the first storage space is successfully configured and the third storage space is not successfully configured, splitting the weight data in the first target dimension to obtain the splitting result of the weight data, and configuring the second storage space in the first memory for the weight data after splitting, based on the splitting result of the weight data; then, if the second storage space is successfully configured, resplitting the input data in the second target dimension to obtain a resplitting result of the input data and reconfiguring the third storage space in the first memory for the input data after resplitting, based on the resplitting result of the input data.

In an embodiment of the present disclosure, S212A further includes: if neither of the first storage space and the third storage space is successfully configured, resplitting the weight data in the first target dimension to obtain a resplitting result of the weight data, and reconfiguring the second storage space in the first memory for the weight data after resplitting, based on the resplitting result of the weight data; then, if the second storage space is successfully reconfigured, resplitting the input data in the second target dimension to obtain a resplitting result of the input data, and reconfiguring the third storage space in the first memory for the input data after resplitting, based on the resplitting result of the input data; a splitting method of resplitting the weight data is different from that of splitting the weight data.

In an embodiment of the present disclosure, the operation of splitting the weight data and configuring the second storage space in S212A further includes: S212A-1: splitting the weight data in the first target dimension based on a first splitting parameter so as to obtain the splitting result of the weight data, and configuring the second storage space in the first memory for the weight data after splitting, based on the splitting result of the weight data; S212A-2: if the second storage space is not successfully configured based on the splitting result of the weight data, restoring the first memory to a state before the second storage space is configured and updating the first splitting parameter so as to obtain an updated first splitting parameter, which is for further splitting of the weight data in the first target dimension; and repeating S212A-1 and S212A-2 until the second storage space is successfully configured or until all available values of the first splitting parameter are traversed through, wherein the first splitting parameter specifies the number of parts the weight data is split into.

In an embodiment of the present disclosure, S212B further includes: S212B-1: splitting the input data in the second target dimension based on a second splitting parameter so as to obtain the splitting result of the input data, and configuring the third storage space in the first memory for the input data after splitting, based on the splitting result of the input data; S212B-2: if the third storage space is not successfully configured based on the splitting result of the input data, restoring the first memory to a state before the third storage space is configured and updating the second splitting parameter so as to obtain an updated second splitting parameter, which is for further splitting of the input data in the second target dimension; and repeating S212B-1 and S212B-2 until the third storage space is successfully configured or until all available values of the second splitting parameter are traversed through, wherein the second splitting parameter specifies the number of parts the input data is split into.

In an embodiment of the present disclosure, the second target dimension includes a channel dimension and a height dimension, and the second splitting parameter includes a channel-dimension splitting parameter and a height-dimension splitting parameter; S212B-1 further includes S212B-11: splitting the input data in the channel dimension based on the channel-dimension splitting parameter, to obtain a first splitting sub-result of the input data, and configuring the third storage space in the first memory for the input data after splitting, based on the first splitting sub-result of the input data; and S212B-2 further includes S212B-21 following S212B-11 and including: if the third storage space is not successfully configured based on the first splitting sub-result of the input data, restoring the first memory to the state before the third storage space is configured and updating the channel-dimension splitting parameter so as to obtain an updated channel-dimension splitting parameter, which is for further splitting of the input data in the channel dimension; and repeating S212B-21 and S212B-11 until the third storage space is successfully configured or until all available values of the channel-dimension splitting parameter are traversed through; S212B-1 further includes S212B-12: if the input data is not successfully split in the channel dimension, splitting the input data in the height dimension based on the height-dimension splitting parameter, to obtain a second splitting sub-result of the input data, and configuring the third storage space in the first memory for the input data after splitting, based on the second splitting sub-result of the input data; and S212B-2 further includes S212B-22 following S212B-12 and including: restoring the first memory to the state before the third storage space is configured and updating the height-dimension splitting parameter so as to obtain an updated height-dimension splitting parameter, which is for further splitting of the input data in the height dimension; and repeating S212B-12 and S212B-22 until the third storage space is successfully configured or all available values of the height-dimension splitting parameter are traversed through.

In an embodiment of the present disclosure, the artificial intelligence hardware accelerator further includes a second memory.

In an embodiment of the present disclosure, the method further includes: determining whether the output data of the target operators needs to be moved to the second memory.

In an embodiment of the present disclosure, the data to be split includes weight data, input data, and output data of the target operators, the output data needs to be moved to the second memory, and S21 includes: S211': splitting the weight data in a first target dimension to obtain a splitting result of the weight data, and configuring a second storage space in the first memory for the weight data after splitting, based on the splitting result of the weight data; S212': after the second storage space is successfully configured, splitting the input data in a second target dimension to obtain a splitting result of the input data, and configuring a third storage space in the first memory for the input data after splitting, based on the splitting result of the input data; and S213': after the third storage space is successfully configured, configuring a first storage space in the first memory for the output data.

In an embodiment of the present disclosure, S213' further includes: obtaining a splitting result of the output data based on the splitting result of the input data, and configuring the first storage space in the first memory for the output data after splitting, based on the splitting result of the output data; or splitting the output data in a third target dimension to obtain the splitting result of the output data, and configuring the first storage space in the first memory for the output data after splitting, based on the splitting result of the output data.

In an embodiment of the present disclosure, the method further includes: if the first storage space is not successfully configured, restoring the first memory to a state before the second storage space is configured, resplitting the weight data in the first target dimension, and reconfiguring the second storage space in the first memory for the weight data after resplitting, based on a resplitting result of the weight data; after the second storage space is successfully reconfigured, resplitting the input data in the second target dimension, and reconfiguring the third storage space for the input data after resplitting, based on a resplitting result of the input data; and after the third storage space is successfully configured, reconfiguring the first storage space for the output data in the first memory, wherein a splitting method of resplitting the weight data is different from that of splitting the weight data; if the third storage space is not successfully configured, resplitting the weight data in the first target dimension, and reconfiguring the second storage space in the first memory for the weight data after splitting, based on the resplitting result of the weight data; after the second storage space is successfully configured, resplitting the input data in the second target dimension; and reconfiguring the third storage space in the first memory for the input data after resplitting, based on the resplitting result of the input data, wherein a splitting method of resplitting the weight data is different from that of splitting the weight data.

In an embodiment of the present disclosure, the first storage space, the second storage space, and the third storage space are all configured to include a ping-pong buffer.

In an embodiment of the present disclosure, after the storage layout of the target operators is obtained, the method further includes: if the output data needs to be moved to the second memory, releasing the first storage space configured for the output data in the first memory.

In an embodiment of the present disclosure, after the storage layout of the target operators is obtained, the method further includes: releasing the second storage space configured for the weight data and the third storage space configured for the input data in the first memory.

In an embodiment of the present disclosure, there are at least two target operators, and the method further includes: performing a topological sorting of the target operators to obtain an order of execution of the target operators.

A second aspect of the present disclosure provides a device for splitting operators, the device for splitting operators is applied to a compilation stage of an artificial intelligence hardware accelerator, the artificial intelligence hardware accelerator includes a first memory, and the device for splitting operators includes: a buffer-information acquisition module, for obtaining buffer information required by target operators; an operator splitting and memory configuration module, for splitting the target operators to obtain a splitting result of the target operators and obtaining a storage layout of the target operators in the first memory, based on the buffer information required by the target operators; the splitting result of the target operators and the storage layout of the target operators are used to implement a mapping of a target artificial intelligence model to the artificial intelligence hardware accelerator.

A third aspect of the present disclosure provides a non-transitory computer readable storage medium, at least one computer program is stored on the non-transitory computer readable storage medium, and the method for splitting operators according to the first aspect of the present disclosure is implemented when the at least one computer program is executed by a processor.

DETAILED DESCRIPTION

The embodiments of the present disclosure will be described below through specific examples. Those skilled in the art can easily understand the other advantages and effects of the present disclosure according to contents disclosed in the specification. The present disclosure may also be implemented or applied through other different embodiments, and various modifications or changes may be made to all details in the specification based on different points of view and applications without departing from the spirit of the present disclosure. It should be noted that the following embodiments and the features in the embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the layout of the components can also be more complicated. In addition, terms such as "first", "second" are only used to distinguish one entity or operation from another entity or operation, and do not necessarily require or imply any such actual relationship or order between these entities or operations.

An AI hardware accelerator with a tiered storage structure usually has an internal storage space with a smaller capacity, and therefore, in order to achieve a mapping of an AI model to such an AI hardware accelerator, the operators in the AI model needs to be split to be compatible with the tiered storage structure of the AI hardware accelerator. Therefore, the present disclosure provides a method for splitting operators. Specific embodiments of the present disclosure are described in detail in an exemplary manner with reference to accompanying drawings.

Figure 1:
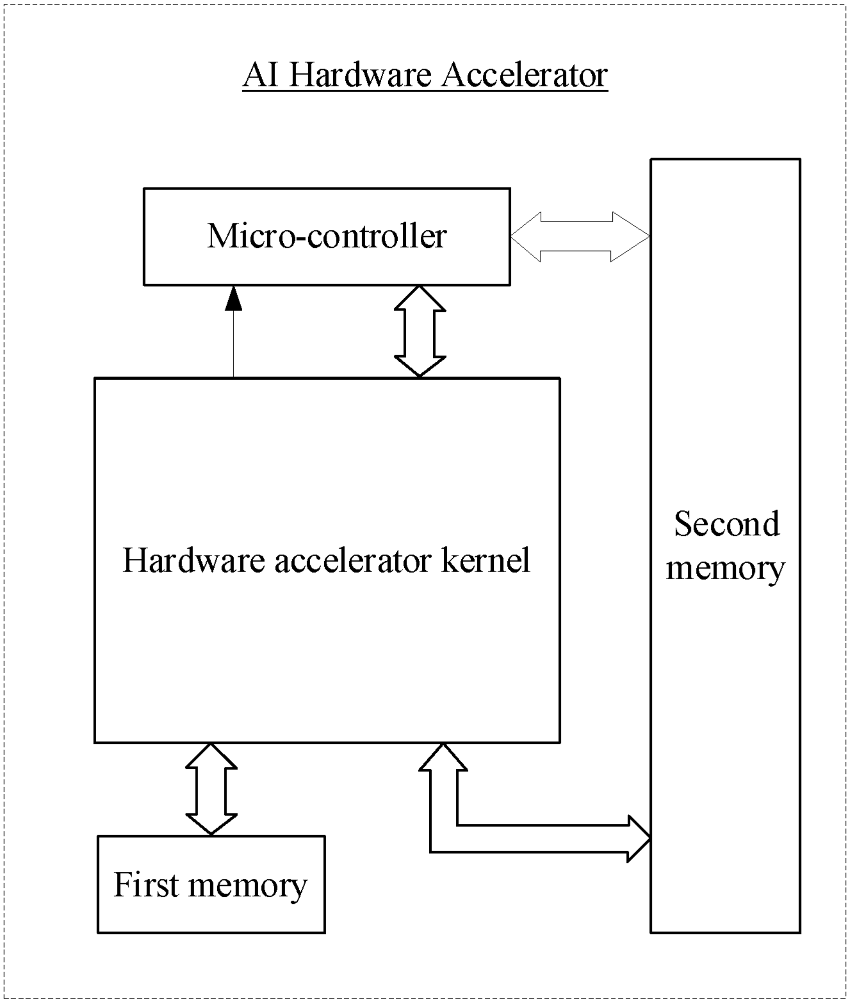
FIG. 1 is a schematic structural diagram of an artificial intelligence hardware accelerator involved in a method for splitting operators according to an embodiment of the present disclosure.

FIG. 1 is a schematic structural diagram of an AI hardware accelerator according to an embodiment of the present disclosure. As shown in FIG. 1, the AI hardware accelerator further includes a hardware accelerator kernel and a first memory communicatively connected to the hardware accelerator kernel. Further, the AI hardware accelerator further includes a second memory and a micro-controller, which are communicatively connected to the hardware accelerator kernel. The first memory can be an internal memory (e.g., a static random-access memory (SRAM)) of the AI hardware accelerator, the second memory can be an external memory (e.g., a dynamic random access memory (DRAM)), a storage capacity of the first memory can be smaller than that of the second memory, and a bandwidth of the first memory can be larger than that of the second memory. It should be noted that FIG. 1 only shows an exemplary structure of the AI hardware accelerator.

Figure 2:
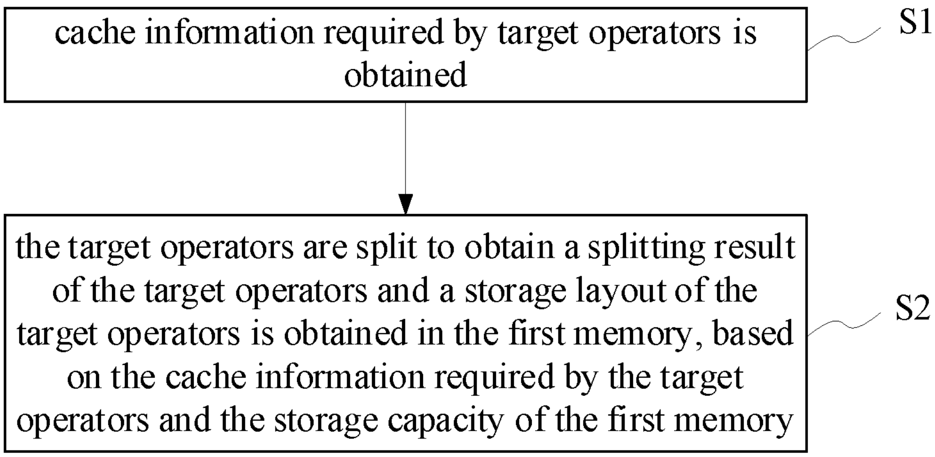
FIG. 2 is a flowchart of a method for splitting operators according to an embodiment of the present disclosure.

FIG. 2 is a flowchart of a method for splitting operators according to an embodiment of the present disclosure. As shown in FIG. 2, the method for splitting operators includes step S1 and step S2.

In step S1, buffer information required by target operators is obtained. The target operators are one or more operators in a target AI model, such as convolution operators, pooling operators, etc. The target AI model is, for example, a deep learning model. The buffer information required by the target operators is, for example, the number of the buffers required by the target operators, a buffer size of each of the buffers, a life cycle, producers, and/or consumers etc.

In step S2, the target operators are split to obtain a splitting result of the target operators and a storage layout of the target operators is obtained in the first memory, based on the buffer information required by the target operators and the storage capacity of the first memory. The splitting result of the target operators and the storage layout of the target operators in the first memory are used to implement a mapping of the target AI model to the AI hardware accelerator. The storage layout of the target operators in the first memory includes one or more storage locations of the target operators in the first memory and a storage capacity required to store the target operators.

Therefore, the method for splitting operators can split the target operators to obtain the splitting result of the target operators and obtain the storage layout of the target operators in the first memory, based on the buffer information required by the target operators and the storage capacity of the first memory. Based on the splitting result of the target operators and the storage layout of the target operators, the present disclosure can implement the mapping of the target AI model to the AI hardware accelerator.

Figure 3:
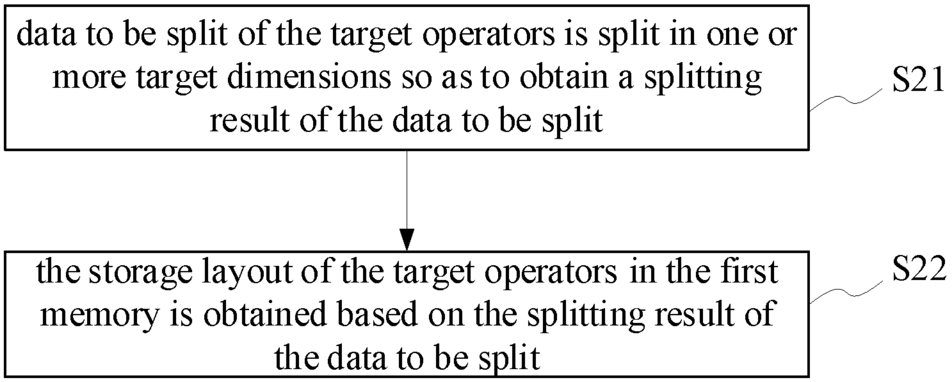
FIG. 3 is a flowchart of step S2 in a method for splitting operators according to an embodiment of the present disclosure.

Please refer to FIG. 3. In an embodiment of the present disclosure, step S2 further includes step S21 and step S22.

In step S21, data to be split of the target operators is split in one or more target dimensions so as to obtain a splitting result of the data to be split. The "data to be split" refers to some or all of the data related to a computation process of the target operators. In some embodiments, the data to be split includes input data, weight data, and output data of the target operators. In other embodiments, the data to be split includes input data and output data of the target operators. In other embodiments, the data to be split only includes output data of the target operators. It should be noted that the above embodiments list several examples of the data to be split in a non-exhaustive manner. Furthermore, in the AI model, the data related to the computation process of the target operators is usually multidimensional data, and for any multidimensional data, the target dimensions are one or more dimensions of the multidimensional data. For example, the input data of the convolution operators includes four dimensions: a batch dimension (hereinafter, N dimension), a height dimension (hereinafter, H dimension), a width dimension (hereinafter, W dimension), and a channel dimension (hereinafter, C dimension). The target dimensions can include only one of the above four dimensions, for example, only the C dimension, or include two or more of the above four dimensions, for example, the C dimension and the H dimension.

In step S22, the storage layout of the target operators in the first memory is obtained based on the splitting result of the data to be split. In an embodiment, after the data to be split is split, the number of storage spaces required by the data to be split and a storage capacity of each of the storage spaces can be obtained based on the splitting result of the data to be split. Therefore, the storage layout of the target operators in the first memory can be obtained based on the splitting result of the data to be split. For example, if the data to be split of a certain target operator only includes the output data, and the output data is split into two parts in step S21, for example, one part is 10 KB in size and the other part is 15 KB in size; a first storage space with a storage capacity of 10 KB and a second storage space with a storage capacity of 15 KB can be configured in the first memory in step S22 to store the output data after splitting; and the locations of the first storage space and the second storage space in the first memory, the storage capacity of the first storage space, and the storage capacity of the second storage space may be collectively referred to as the storage layout of the target operators in the first memory.

In an embodiment, the data to be split includes input data, weight data, and output data of the target operators. In an embodiment, step S21 includes step 211, and step 212A or step 212B.

In step S211, a first storage space is configured in the first memory for the output data. The first storage space is used to store the output data. In an embodiment, step S211 includes the following steps: a size of a storage space required by the output data is obtained based on a size of the output data, a storage-space request is made to a memory allocator of the first memory based on the size, so that the memory allocator finds whether there is an available storage space in the first memory that meets the requirements. If the memory allocator finds an available storage space in the first memory that suits the output data, this available storage space is configured as the first storage space, at which time, the first storage space is successfully configured. If the first storage space is successfully configured, the method proceeds to step 212B, and if the first storage space is not successfully configured, the method proceeds to step 212A.

In an embodiment, the memory allocator can be used to perform operations on the first memory, for example, allocating a storage space, releasing a storage space, resetting a storage space, and/or restoring a storage space.

In an embodiment, the memory allocator can be used to perform fragmentation management on the first memory, i.e., after a memory block (e.g., a storage space) is released, other available memory blocks connected to the memory block are merged with the released memory block.

In step S212A, if the first storage space is not successfully configured, the weight data is split in a first target dimension to obtain a splitting result of the weight data, and a second storage space is configured in the first memory for the weight data after splitting, based on the splitting result of the weight data; if the second storage space is successfully configured, the input data is split in a second target dimension to obtain a splitting result of the input data, and a third storage space is configured in the first memory for the input data after splitting, based on the splitting result of the input data. The first target dimension is one or more dimensions of the weight data, and for example, the first target dimension includes the K dimension of the weight data. The second target dimension is one or more dimensions of the input data, and for example, the second target dimension includes the C dimension and the H dimension of the input data.

In step S212B, if the first storage space is successfully configured, the input data is split in the second target dimension to obtain the splitting result of the input data, and the third storage space is configured in the first memory for the input data after splitting, based on the splitting result of the input data.

Therefore, the method of the present disclosure is able to preferentially allocate the first storage space for the output data of the target operators, which reduces the probability of intermediate data being moved to other memories, thereby improving the performance of the AI hardware accelerator. It should be noted that prioritizing the configuration of one or more storage spaces for the output data of the target operators is only one embodiment of the present disclosure.

In an embodiment, step S212B further includes: if the first storage space is successfully configured and the third storage space is not successfully configured, splitting the weight data in the first target dimension to obtain the splitting result of the weight data, and configuring the second storage space in the first memory for the weight data after splitting, based on the splitting result of the weight data; after the second storage space is successfully configured, resplitting the input data in the second target dimension to obtain a resplitting result of the input data, and reconfiguring the third storage space in the first memory for the input data after resplitting, based on the resplitting result of the input data.

In an embodiment, step S212B further includes: if the third storage space is still not successfully reconfigured, resplitting the weight data in the first target dimension to obtain a resplitting result of the weight data, and reconfiguring the second storage space in the first memory for the weight data after resplitting, based on the resplitting result of the weight data; if the second storage space is successfully reconfigured, resplitting the input data in the second target dimension to obtain the resplitting result of the input data, and reconfiguring the third storage space in the first memory for the input data after resplitting, based on the resplitting result of the input data. A splitting method of resplitting the weight data is different from that of splitting the weight data, and a difference between the splitting methods of splitting the weight data and the splitting method of resplitting the weight data is a splitting parameter. The splitting parameter is, for example, the number of parts the weight data is split into. If the third storage space is still not successfully configured, the above steps are repeated until the third storage space is successfully configured or until all the splitting methods of the weight data are traversed through.

The above process will be described in detail with an example. First, we assume that the weight data has 3 splitting methods, and the above process includes: splitting the weight data in a first splitting method, configuring the second storage space for the weight data after splitting to obtain a first configuration result of the second storage space; splitting the input data in the second target dimension to obtain the splitting result of the input data based on the first configuration result of the second storage space and a storage state of the first memory, and configuring the third storage space for the input data after splitting, based on the splitting result of the input data; if the second storage space is successfully configured (that is, the first configuration result is "success"), ending splitting of the weight data and the input data, otherwise, resplitting the weight data in a second splitting method, and reconfiguring the second storage space for the weight data after resplitting to obtain a second reconfiguration result of the second storage space; resplitting the input data in the second target dimension to obtain the resplitting result of the input data based on the second reconfiguration result of the second storage space and the storage state of the first memory, and reconfiguring the third storage space for the input data after resplitting based on the resplitting result of the input data; if the second storage space is successfully configured (that is, the second configuration result is "success"), ending the splitting of the weight data and the input data, otherwise, resplitting the weight data in a third splitting method, and reconfiguring the second storage space for the weight data after resplitting to obtain a third reconfiguration result of the second storage space; resplitting the input data in the second target dimension to obtain the resplitting result based on the third reconfiguration result of the second storage space and the storage state of the first memory, and reconfiguring the third storage space for the input data after resplitting based on the resplitting result of the input data; if the second storage space is successfully reconfigured (that is, the third configuration result is "success"), ending the splitting of the weight data and the input data, otherwise, determining that the splitting of the weight data and the input data cannot be completed.

In an embodiment, step S212A further includes: if neither of the first storage space and the third storage space is successfully configured, resplitting the weight data in the first target dimension to obtain the resplitting result of the weight data, and reconfiguring the second storage space in the first memory for the weight data after resplitting, based on the resplitting result of the weight data; if the second storage space is successfully configured, resplitting the input data in the second target dimension to obtain the resplitting result of the input data and reconfiguring the third storage space in the first memory for the input data after resplitting, based on the resplitting result of the input data, wherein a splitting method of resplitting the weight data is different from that of splitting the weight data. If the third storage space is not successfully configured, the above steps are repeated until the third storage space is successfully reconfigured or until all the splitting methods of the weight data are traversed through.

In an embodiment, the operation of splitting the weight data and configuring the second storage space in S212A further includes step S212A-1 and step S212A-2. In step S212A-1, the weight data is split in the first target dimension based on a first splitting parameter so as to obtain the splitting result of the weight data, and the second storage space is configured in the first memory for the weight data after splitting, based on the splitting result of the weight data; in step S212A-2, if the second storage space is not successfully configured based on the splitting result of the weight data, the first memory is restored to a state before the second storage space is configured and the first splitting parameter is updated so as to obtain an updated first splitting parameter, which is for further splitting of the weight data in the first target dimension; and steps S212A-1 and S212A-2 are repeated until the second storage space is successfully configured or until all available values of the first splitting parameter are traversed through; the first splitting parameter specifies the number of parts the weight data is split into. For example, if a certain weight data can be split into at most K parts, available values of the first splitting parameter are in a range of 1 to K, where K is a positive integer. That is, the available values of the first splitting parameter are 1, 2, . . . , and K. If the second storage space is successfully configured when the value of the first splitting parameter is m (where $1 \le m \le K$ and m is a positive integer), the splitting of the weight data is ended, in other words, the weight data has been successfully split and the second storage space has been successfully configured. If the third storage space is not successfully configured after traversing through all available values of the second splitting parameter, it is determined that the third storage space can not be successfully configured either.

In an embodiment, step S212B includes step S212B-1 and step S212B-2. In step S212B-1, the input data is split in the second target dimension based on a second splitting parameter so as to obtain the splitting result of the input data, and the third storage space is configured in the first memory for the input data after splitting, based on the splitting result of the input data; in step S212B-2, if the third storage space is not successfully configured based on the splitting result of the input data, the first memory is restored to a state before the third storage space is configured and the second splitting parameter is updated so as to obtain an updated second splitting parameter, which is for further splitting of the input data in the second target dimension; and steps S212B-1 and S212B-2 are repeated until the third storage space is successfully configured or until all available values of the second splitting parameter are traversed through. The second splitting parameter specifies the number of parts the input data is split into. If the third storage space is not successfully configured after traversing through all available values of the second splitting parameter, it is determined that the configuration of the third storage space fails.

In an embodiment, the second target dimension includes the C dimension and the H dimension, and the second splitting parameter includes a channel-dimension splitting parameter and a height-dimension splitting parameter.

In an embodiment of the present disclosure, step S212B-1 further includes step S212B-11, and in step S212B-11, the input data is split in the channel dimension based on the channel-dimension splitting parameter, to obtain a first splitting sub-result of the input data, and the third storage space is configured in the first memory for the input data after splitting, based on the first splitting sub-result of the input data; and step S212B-2 further includes step S212B-21 following step S212B-11, and in step S212B-21, if the third storage space is not successfully configured based on the first splitting sub-result of the input data, the first memory is restored to the state before the third storage space is configured and the channel-dimension splitting parameter is updated so as to obtain an updated channel-dimension splitting parameter, which is for further splitting of the input data in the channel dimension; and steps S212B-21 and S212B-11 are repeated until the third storage space is successfully configured or until all available values of the channel-dimension splitting parameter are traversed through. If the second storage space is not successfully configured after traversing through all available values of the channel-dimension splitting parameter, it is determined that the configuration of the third storage space fails in the channel dimension.

In an embodiment of the present disclosure, step S212B-1 further includes step S212B-12, and in step S212B-12, if the input data is not successfully split in the channel dimension, the input data is split in the height dimension based on the height-dimension splitting parameter, to obtain a second splitting sub-result of the input data, and the third storage space is configured in the first memory for the input data after splitting, based on the second splitting sub-result of the input data; and step S212B-2 further includes step S212B-22 following step S212B-12, and in step S212B-22, the first memory is restored to the state before the third storage space is configured and the height-dimension splitting parameter is updated so as to obtain an updated height-dimension splitting parameter, which is for further splitting of the input data in the height dimension; and steps S212B-12 and S212B-22 are repeated until the third storage space is successfully configured or all available values of the height-dimension splitting parameter are traversed through. If the second storage space is not successfully configured after traversing through all available values of the height-dimension splitting parameter, it is determined that the configuration of the second storage space fails.

In an embodiment of the present disclosure, the AI hardware accelerator further includes a second memory. The method further includes: determining whether the output data of the target operators needs to be moved to the second memory. If the output data does not need to be moved to the second memory, the data to be split of the target operators can be split by performing steps S211 and S212A, or steps S211 and S212B. If the output data needs to be moved to the second memory, the data to be split of the target operators can be split by performing the steps S211', S212', and S213'.

In an embodiment, based on a data size of the output data, a ratio of the data size of the output data to the storage capacity of the first memory, the number of consumers of the output data, and/or topological distances between the output data and its consumers, it is determined whether the output data needs to be moved to the second memory.

In an embodiment, a direct memory access (DMA) operator is used to implement data transfer between the first memory and the second memory.

In an embodiment, the first memory includes an on-chip SRAM and the second memory includes an off-chip DRAM.

Figure 4:
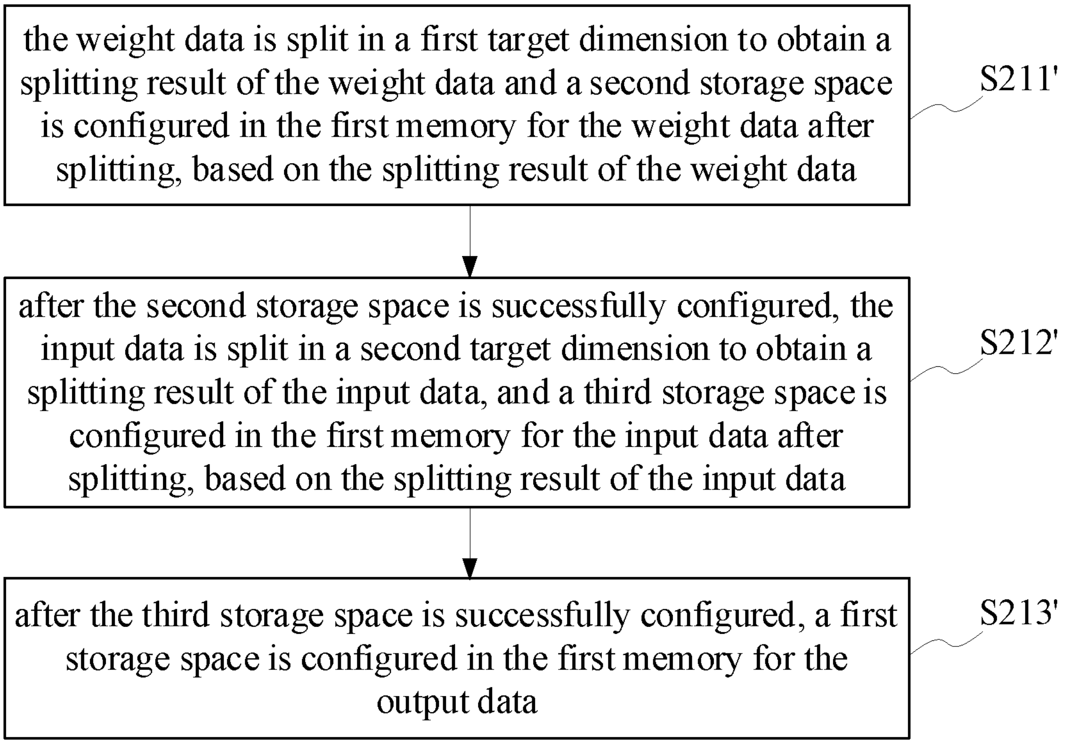
FIG. 4 is a flowchart of step S21 in a method for splitting operators according to an embodiment of the present disclosure.

In an embodiment of the present disclosure, the data to be split includes weight data, input data, and output data of the target operators, and the output data needs to be moved to the second memory. Referring to FIG. 4, step S21 includes step S211', step S212', and step S213' in one embodiment.

In step S211', the weight data is split in a first target dimension to obtain a splitting result of the weight data and a second storage space is configured in the first memory for the weight data after splitting, based on the splitting result of the weight data.

In step S212', after the second storage space is successfully configured, the input data is split in a second target dimension to obtain a splitting result of the input data, and a third storage space is configured in the first memory for the input data after splitting, based on the splitting result of the input data. A method for configuring the third storage space in step S212' is similar to that for configuring the third storage space in step S212B.

In step S213', after the third storage space is successfully configured, a first storage space is configured in the first memory for the output data.

In an embodiment, step S213' further includes: obtaining the splitting result of the output data based on the splitting result of the input data, and configuring the first storage space in the first memory for the output data after splitting, based on the splitting result of the output data. For the target operators, the exact splitting method of the output data can be inferred from the splitting method of the input data, and therefore the splitting method of the output data can be obtained based on the splitting result of the input data of the target operators, and then used to obtain the splitting result of the output data.

In an embodiment, step S213' further includes: splitting the output data is split in a third target dimension to obtain the splitting result of the output data, and configuring the first storage space in the first memory for the output data after splitting, based on the splitting result of the output data.

In an embodiment, after step S211', the method for splitting operators further includes: if the first storage space is not successfully configured, restoring the first memory to a state before the second storage space is configured, resplitting the weight data is resplit in the first target dimension, and reconfiguring the second storage space in the first memory for the weight data after resplitting, based on the resplitting result of the weight data; after the second storage space is successfully reconfigured, resplitting the input data in the second target dimension, and reconfiguring the third storage space for the input data after resplitting, based on the resplitting result of the input data; and after the third storage space is successfully configured, reconfiguring the first storage space for the output data in the first memory, wherein a splitting method of resplitting the weight data is different from that of splitting the weight data. If the first storage space is still not successfully configured, the above operations are repeated until the first storage space is successfully configured or until all the splitting methods of the weight data are traversed through.

In an embodiment, after step S212', the method for splitting operators further includes: if the third storage space is not successfully configured, resplitting the weight data in the first target dimension, and reconfiguring the second storage space in the first memory for the weight data after splitting, based on the resplitting result of the weight data; after the second storage space is successfully configured, resplitting the input data in the second target dimension; and reconfiguring the third storage space in the first memory for the input data after resplitting, based on the resplitting result of the input data, wherein a splitting method of resplitting the weight data is different from that of splitting the weight data. If the third storage space is not successfully configured, the above operations are repeated until the third storage space is successfully reconfigured or until all the splitting methods of the weight data are traversed through.

In one embodiment, step S211' includes steps S211'-1, S211'-2, and S211'-3.

In step S211'-1, the weight data is split in the first target dimension based on the first splitting parameter so as to obtain the splitting result of the weight data, and the second storage space is configured in the first memory for the weight data after splitting, based on the splitting result of the weight data; in step SS211'-2, if the second storage space is not successfully configured based on the splitting result of the weight data, the first memory is restored to a state before the second storage space is configured and the first splitting parameter is updated so as to obtain an updated first splitting parameter, which is for further splitting of the weight data in the first target dimension; steps S211'-1 and S211'-2 are repeated until the second storage space is successfully configured or until all available values of the first splitting parameter are traversed through. The first splitting parameter specifies the number of parts the weight data is split into.

In step S211'-3, if the second storage space are still not successfully configured after traversing through all available values of the first splitting parameter, the first storage space configured for the output data in the first memory is released and steps S211'-1, and S211'-2 are repeated.

Figure 5:
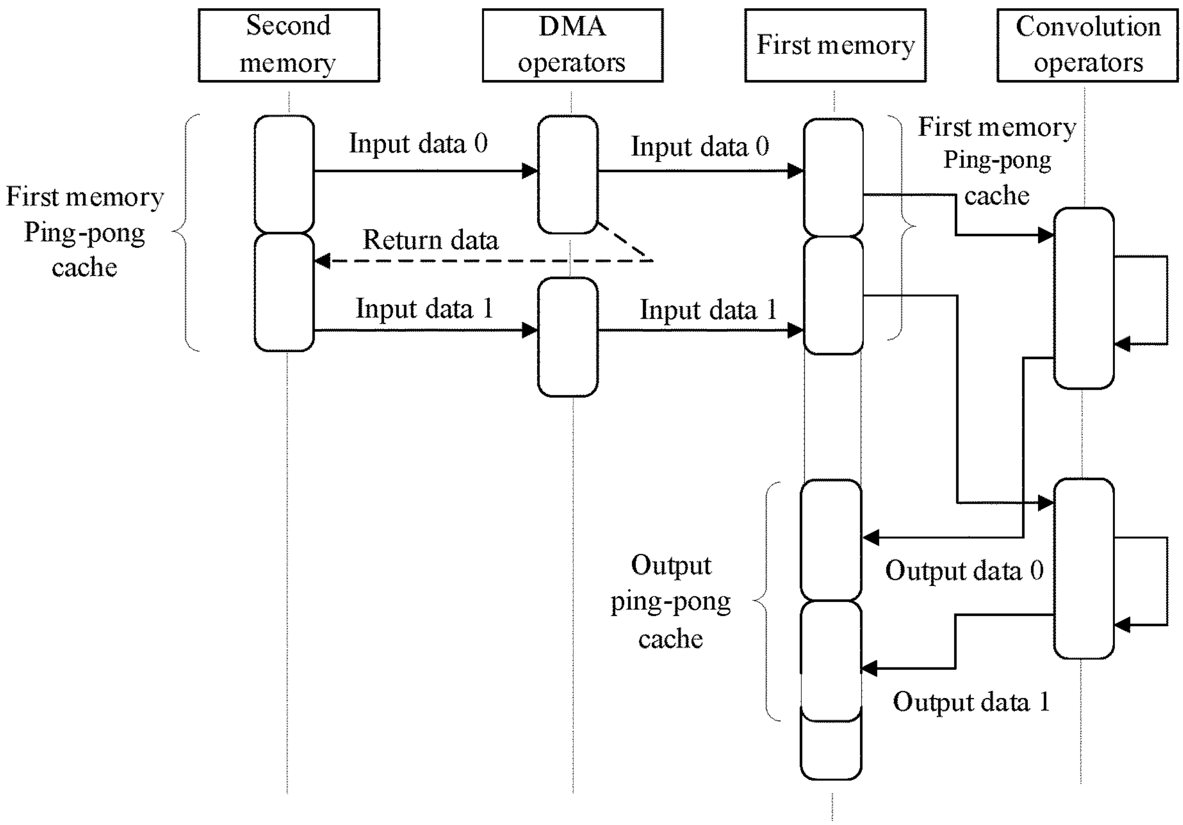
FIG. 5 is an exemplary diagram illustrating parallel data transfer and data computing through ping-pong buffers in a method for splitting operators according to an embodiment of the present disclosure.

In an embodiment of the present disclosure, the first storage space, the second storage space, and the third storage space are all configured to include a ping-pong buffer. Correspondingly, the second memory is configured to include a ping-pong buffer in one embodiment. Refer to FIG. 5, which is an exemplary diagram illustrating parallel data transfer and data computing through a ping-pong buffer in a method for splitting operators according to an embodiment of the present disclosure. As shown in FIG. 5, the ping-pong buffers in the first memory and the second memory enable the convolution operation of the input data “0” and the transfer of the input data “1” to be performed simultaneously, and thus the AI hardware accelerator is capable of performing the transfer and the computation of data in parallel.

In an embodiment of the present disclosure, after the storage layout of the target operators is obtained, the method further includes: releasing the second storage space configured for the weight data in the first memory; releasing the third storage space configured for the input data in the first memory; and if the output data needs to be moved the second memory, releasing the first storage space configured for the output data in the first memory.

In an embodiment of the present disclosure, there are at least two target operators, and the method further includes: a topological sorting of the target operators is performed to obtain an order of execution of the target operators. Based on the order of execution of the target operators, the target operators can be split in turn to obtain the storage layout of the target operators in the first memory.

The scope of the method for splitting operators described in the present disclosure is not limited by the execution orders of various steps enumerated in the embodiment. Any omission or replacement of the steps, or extra steps consistent with the principles of the present disclosure is within the scope of the present disclosure.

Figure 6:
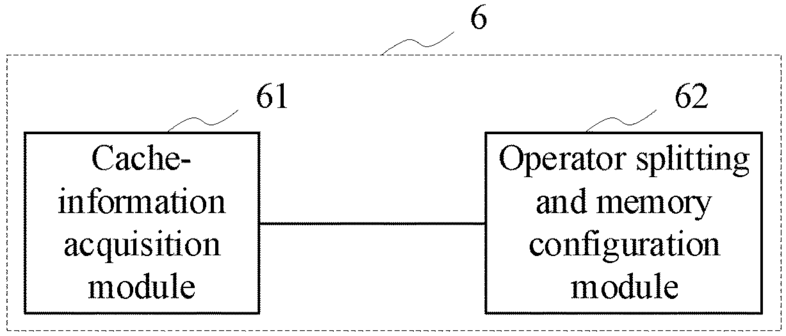
FIG. 6 is a schematic structural diagram of a device for splitting operators according to an embodiment of the present disclosure.

The present disclosure further provides a device for splitting operators. The device for splitting operators is applied to a compiler of an AI hardware accelerator, and the AI hardware accelerator includes a first memory. FIG. 6 is a schematic structural diagram of a device for splitting operators according to an embodiment of the present disclosure. The device 6 for splitting operators includes a buffer-information acquisition module 61 and an operator splitting and memory configuration module 62. The buffer-information acquisition module 61 is for obtaining buffer information required by target operators 62. The operator splitting and memory configuration module 62 is for splitting the target operators to obtain a splitting result of the target operators and obtaining a storage layout of the target operators in the first memory, based on the buffer information required by the target operators; the splitting result of the target operators and the storage layout of the target operators are used to implement a mapping of a target AI model to the AI hardware accelerator.

It should be noted that the buffer-information acquisition module 61 corresponds to step S1 and the operator splitting and memory configuration module 62 correspond to step S2 in the method for splitting operators shown in FIG. 1.

It should be noted that the division of each module of the device for splitting operators is only a division of logical functions. In actual implementation, the modules may be integrated into one physical entity in whole or in part, or may be physically separated. These modules are all implemented in the form of processing component calling by software, these modules are all implemented in the form of hardware, or it is also possible that some modules are implemented in the form of processing component calling by software, and some modules are implemented in the form of hardware. For example, the buffer-information acquisition module 61 and the operator splitting and memory configuration module 62 may be one or more integrated circuits configured to implement the above methods, for example: one or more application specific integrated circuits (ASICs), or one or more microprocessors (Digital signal processor, DSP), or, one or more Field Programmable Gate Array (FPGA), etc. For another example, when one of the above modules is implemented in the form of processing element scheduling program code, the processing element may be a general-purpose processor, such as a central processing unit (CPU), a graphic processing unit (GPU), or other processors that can call program codes. For another example, these modules can be integrated together and implemented in the form of a system-on-a-chip (SOC).

The device for splitting operators can implement the method for splitting operators described in the present disclosure, but devices for implementing the method for splitting operators described in the present disclosure include, but are not limited to, the device for splitting operators as described above, and any structural deformation and replacement of the related art made according to the principles of the present disclosure is included in the scope of the present disclosure.

The present disclosure further provides a non-transitory computer readable storage medium, and at least one computer program is stored on the non-transitory computer readable storage medium. The method for splitting operators in FIG. 2 is implemented when the at least one computer program is executed by a processor. The non-transitory computer readable storage medium includes, but is not limited to, a USB flash disk, a mobile hard disk, a read-only memory (ROM), a random access memory (RAM), a disk or an optical disk, or any other storage medium that can be used to store program codes.

As described above, one or more embodiments of the present disclosure can split the target operators to obtain the splitting result of the target operators and obtain the storage layout of the target operators in the first memory based on the buffer information required by the target operators and the storage capacity of the first memory. Based on the splitting result of the target operators and the storage layout of the target operators, the present disclosure can implement the mapping of the target AI model to the AI hardware accelerator.

As described above, the method for splitting operators, the device for splitting operators, and the non-transitory computer readable storage medium of the present disclosure have the following beneficial effects:

Based on the storage capacity of the first memory and the buffer information required by the target operators, the present disclosure provides a method, a device, and a medium, which are for rapidly splitting the target operators, allocating and recycling memory space, and achieving parallel data transfer and data computing. Moreover, the above-mentioned target operators splitting, memory space allocating and recycling, and parallel data transfer and data computing are completed at the compilation stage, the buffer information required by the target operators is therefore static and speculative, and no temporary or dynamic memory is generated, which simplifies the solution and improve implementation efficiency of the solution.

The above embodiments are illustrative of the principles and benefits of the present disclosure rather than restrictive of the scope of the present disclosure. Persons skilled in the art can make modifications and changes to the embodiments without departing from the spirit and scope of the present disclosure. Therefore, all equivalent modifications and changes made by persons skilled in the art without departing from the spirit and technical concepts disclosed in the present disclosure shall still be deemed falling within the scope of the claims of the present disclosure.

What is claimed is:

1. A method for splitting operators, wherein the method is applied to a compilation stage of an artificial intelligence hardware accelerator, the artificial intelligence hardware accelerator comprises a first memory, and the method comprises:

S1: obtaining buffer information required by target operators; and

S2: splitting the target operators to obtain a splitting result of the target operators and obtaining a storage layout of the target operators in the first memory, based on the buffer information required by the target operators and a storage capacity of the first memory; wherein the splitting result of the target operators and the storage layout of the target operators are used to implement a mapping of a target artificial intelligence model to the artificial intelligence hardware accelerator;

wherein S2 further comprises:

S21: splitting data to be split of the target operators in one or more target dimensions so as to obtain a splitting result of the data to be split; and S22: obtaining the storage layout of the target operators in the first memory based on the splitting result of the data to be split; wherein the data to be split comprises input data, weight data, and output data of the target operators, and S21 further comprises:

S211: configuring a first storage space in the first memory for the output data; and S212A: if the first storage space is not successfully configured, splitting the weight data in a first target dimension to obtain a splitting result of the weight data, and configuring a second storage space in the first memory for the weight data after splitting, based on the splitting result of the weight data; then, if the second storage space is successfully configured, splitting the input data in a second target dimension to obtain a splitting result of the input data, and configuring a third storage space in the first memory for the input data after splitting, based on the splitting result of the input data; or S212B: if the first storage space is successfully configured, splitting the input data in the second target dimension to obtain the splitting result of the input data, and configuring the third storage space in the first memory for the input data after splitting, based on the splitting result of the input data; or wherein the artificial intelligence hardware accelerator further comprises a second memory, and the data to be split comprises weight data, input data, and output data of the target operators; wherein the output data needs to be moved to the second memory, and S21 further comprises:

S211': splitting the weight data in the first target dimension to obtain a splitting result of the weight data and configuring the second storage space in the first memory for the weight data after splitting, based on the splitting result of the weight data;

S212': after the second storage space is successfully configured, splitting the input data in the second target dimension to obtain the splitting result of the input data, and configuring the third storage space in the first memory for the input data after splitting, based on the splitting result of the input data; and S213': after the third storage space is successfully configured, configuring a first storage space in the first memory for the output data.

2. The method for splitting operators according to claim 1, wherein S212B further comprises:

if the first storage space is successfully configured and the third storage space is not successfully configured, splitting the weight data in the first target dimension to obtain the splitting result of the weight data, and configuring the second storage space in the first memory for the weight data after splitting, based on the splitting result of the weight data; then, if the second storage space is successfully configured, resplitting the input data in the second target dimension to obtain a resplitting result of the input data, and reconfiguring the third storage space in the first memory for the input data after resplitting, based on the resplitting result of the input data.

3. The method for splitting operators according to claim 1, wherein S212A further comprises:

if neither the first storage space and the third storage space is successfully configured, resplitting the weight data in the first target dimension to obtain a resplitting result of the weight data, and reconfiguring the second storage space in the first memory for the weight data after resplitting, based on the resplitting result of the weight data; then, if the new second storage space is successfully reconfigured, resplitting the input data in the second target dimension to obtain a resplitting result of the input data, and reconfiguring the third storage space in the first memory for the input data after resplitting, based on the resplitting result of the input data;

wherein a splitting method of resplitting the weight data is different from that of splitting the weight data.

4. The method for splitting operators according to claim 1 wherein the operation of splitting the weight data and configuring the second storage space in S212A further comprises:

S212A-1: splitting the weight data in the first target dimension based on a first splitting parameter so as to obtain the splitting result of the weight data, and configuring the second storage space in the first memory for the weight data after splitting, based on the splitting result of the weight data; S212A-2:

if the second storage space is not successfully configured based on the splitting result of the weight data, restoring the first memory to a state before the second storage space is configured and updating the first splitting parameter so as to obtain an updated first splitting parameter, which is for further splitting of the weight data in the first target dimension; and repeating S212A-1 and S212A-2 until the second storage space is successfully configured or until all available values of the first splitting parameter are traversed through; wherein the first splitting parameter specifies a number of parts the weight data is split into.

5. The method for splitting operators according to claim 1, S212B further comprises:

S212B-1: splitting the input data in the second target dimension based on a second splitting parameter so as to obtain the splitting result of the input data, and configuring the third storage space in the first memory for the input data after splitting, based on the splitting result of the input data; S212B-2: if the third storage space is not successfully configured based on the splitting result of the input data, restoring the first memory to a state before the third storage space is configured and updating the second splitting parameter so as to obtain an updated second splitting parameter, which is for further splitting of the input data in the second target dimension; and repeating S212B-1 and S212B-2 until the third storage space is successfully configured or until all available values of the second splitting parameter are traversed through; wherein the second splitting parameter specifies the number of parts the input data is split into.

6. The method for splitting operators according to claim 5, wherein the second target dimension comprises a channel dimension and a height dimension, and the second splitting parameter comprises a channel-dimension splitting parameter and a height-dimension splitting parameter;

wherein S212B-1 further comprises S212B-11: splitting the input data in the channel dimension based on the channel-dimension splitting parameter, to obtain a first splitting sub-result of the input data, and configuring the third storage space in the first memory for the input data after splitting, based on the first splitting sub-result of the input data; and S212B-2 further comprises S212B-21 following $212B-11 and comprising: if the third storage space is not successfully configured based on the first splitting sub-result of the input data, restoring the first memory to the state before the third storage space is configured and updating the channel-dimension splitting parameter so as to obtain an updated channel-dimension splitting parameter, which is for further splitting of the input data in the channel dimension; and repeating S212B-21 and S212B-11 until the third storage space is successfully configured or until all available values of the channel-dimension splitting parameter are traversed through;

wherein S212B-1 further comprises S212B-12: if the input data is not successfully split in the channel dimension, splitting the input data in the height dimension based on the height-dimension splitting parameter, to obtain a second splitting sub-result of the input data, and configuring the third storage space in the first memory for the input data after splitting, based on the second splitting sub-result of the input data; and S212B-2 further comprises S212B-22 following S212B-12 and comprising: restoring the first memory to the state before the third storage space is configured and updating the height-dimension splitting parameter so as to obtain an updated height-dimension splitting parameter, which is for further splitting of the input data in the height dimension; and repeating S212B-12 and S212B-22 until the third storage space is successfully configured or all available values of the height-dimension splitting parameter are traversed through.

7. The method for splitting operators according to claim 1, wherein the method further comprises: determining whether the output data of the target operators needs to be moved to the second memory.

8. The method for splitting operators according to claim 1, wherein S213' further comprises:

obtaining a splitting result of the output data based on the splitting result of the input data, and configuring the first storage space in the first memory for the output data after splitting, based on the splitting result of the output data; or splitting the output data in a third target dimension to obtain the splitting result of the output data, and configuring the first storage space in the first memory for the output data after splitting, based on the splitting result of the output data.

9. The method for splitting operators according to claim 1, wherein the method further comprises:

if the first storage space is not successfully configured, restoring the first memory to a state before the second storage space is configured, resplitting the weight data in the first target dimension, and reconfiguring the second storage space in the first memory for the weight data after resplitting, based on a resplitting result of the weight data; after the second storage space is successfully reconfigured, resplitting the input data in the second target dimension and reconfiguring the third storage space for the input data after resplitting, based on a resplitting result of the input data; and after the third storage space is successfully configured, reconfiguring the first storage space for the output data in the first memory; wherein a splitting method of resplitting the weight data is different from that of splitting the weight data;

if the third storage space is not successfully configured, resplitting the weight data in the first target dimension, and reconfiguring the second storage space in the first memory for the weight data after splitting, based on the resplitting result of the weight data; after the second storage space is successfully configured, resplitting the input data in the second target dimension; and reconfiguring the third storage space in the first memory for the input data after resplitting, based on the resplitting result of the input data; wherein a splitting method of resplitting the weight data is different from that of splitting the weight data.

10. The method for splitting operators according to claim 1, wherein the first storage space, the second storage space, and the third storage space are all configured to include a ping-pong buffer.

11. The method for splitting operators according to claim 1, wherein, after the storage layout of the target operators is obtained, the method further comprises:

if the output data needs to be moved to the second memory, releasing the first storage space configured for the output data in the first memory.

12. The method for splitting operators according to claim 1, wherein, after the storage layout of the target operators is obtained, the method further comprises:

releasing the second storage space configured for the weight data and the third storage space configured for the input data in the first memory.

13. The method for splitting operators according to claim 1, wherein there are at least two target operators, and the method further comprises: performing a topological sorting of the target operators to obtain an order of execution of the target operators.

14. A device for performing the method for splitting operators to claim 1, wherein the device comprises:

a buffer-information acquisition circuit; and a splitting and memory configuration circuit.

15. A non-transitory computer readable storage medium, wherein at least one computer program is stored on the non-transitory computer readable storage medium, and the method for splitting operators according to claim 1 is implemented when the at least one computer program is executed by a processor.

* * * * *